(12) United States Patent
Schultz et al.

(10) Patent No.: US 11,820,844 B2
(45) Date of Patent: Nov. 21, 2023

(54) CHARGE-MODIFIED PARTICLES AND METHODS OF MAKING THE SAME

(71) Applicant: 3M INNOVATIVE PROPERTIES COMPANY, St. Paul, MN (US)

(72) Inventors: Nathan E. Schultz, Woodbury, MN (US); Mikhail A. Belkin, Minneapolis, MN (US); Gerry A. Hoffdahl, Scandia, MN (US); Jimmie R. Baran, Jr., Prescott, WI (US); Tien T. Wu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 672 days.

(21) Appl. No.: 16/980,175

(22) PCT Filed: Mar. 19, 2019

(86) PCT No.: PCT/IB2019/052236
§ 371 (c)(1),
(2) Date: Sep. 11, 2020

(87) PCT Pub. No.: WO2019/180621
PCT Pub. Date: Sep. 26, 2019

(65) Prior Publication Data
US 2021/0002137 A1    Jan. 7, 2021

Related U.S. Application Data

(60) Provisional application No. 62/646,547, filed on Mar. 22, 2018.

(51) Int. Cl.
*C08F 220/36* (2006.01)
*B24D 3/28* (2006.01)
(Continued)

(52) U.S. Cl.
CPC ............ *C08F 220/36* (2013.01); *B05D 1/007* (2013.01); *B24D 3/28* (2013.01); *B24D 3/34* (2013.01);
(Continued)

(58) Field of Classification Search
None
See application file for complete search history.

(56) References Cited

U.S. PATENT DOCUMENTS 2,318,570 A   5/1943   Carlton
2,370,636 A   3/1945   Carlton
(Continued)

FOREIGN PATENT DOCUMENTS

CN   101203538 A   6/2008
CN   101815720 A   8/2010
(Continued)

OTHER PUBLICATIONS

Chan, "Surface modification of piezoelectric aluminum nitride with functionalizable organosilane adlayers", Applied Surface Science, Oct. 2013, vol. 282, pp. 709-713.
(Continued)

*Primary Examiner* — Wayne A Langel
(74) *Attorney, Agent, or Firm* — Bradford B. Wright; Carolyn A. Fischer

(57) ABSTRACT

A charge-modified particle comprising the inorganic core and a shell surrounding the inorganic core, wherein the shell comprises a copolymer comprising monomeric units corresponding to free-radically polymerizable monomers, and wherein at least one of the monomeric units comprises a substituted benzotriazolylphenolate salt. Methods of making the charge-modified particle by admicellar polymerization are also disclosed.

25 Claims, 1 Drawing Sheet

(51) Int. Cl.
*B24D 3/34* (2006.01)
*C08K 3/38* (2006.01)
*B05D 1/00* (2006.01)
*B32B 27/14* (2006.01)
*B82Y 30/00* (2011.01)
*B82Y 40/00* (2011.01)

(52) U.S. Cl.
CPC ............... *B32B 27/14* (2013.01); *C08K 3/38* (2013.01); *B82Y 30/00* (2013.01); *B82Y 40/00* (2013.01); *C08K 2003/385* (2013.01)

(56) References Cited

U.S. PATENT DOCUMENTS

| | | | |
|---|---|---|---|
| 3,079,272 | A | 2/1963 | Greig |
| 4,314,827 | A | 2/1982 | Leitheiser |
| 4,623,364 | A | 11/1986 | Cottringer |
| 4,744,802 | A | 5/1988 | Schwabel |
| 4,770,671 | A | 9/1988 | Monroe |
| 4,881,951 | A | 11/1989 | Wood |
| 5,106,691 | A | 4/1992 | Harwell |
| 5,417,726 | A | 5/1995 | Stout |
| 5,426,136 | A | 6/1995 | Waddell |
| 5,766,277 | A | 6/1998 | DeVoe |
| 5,879,492 | A | 3/1999 | Reis |
| 6,249,159 | B1 | 6/2001 | Johnson |
| 6,664,354 | B2 | 12/2003 | Savu |
| 8,771,801 | B2 | 7/2014 | Moren |
| 8,869,740 | B2 | 10/2014 | Moren |
| 8,894,466 | B2 | 11/2014 | Jungbauer |
| 9,349,498 | B2 | 5/2016 | Lottes |
| 2001/0019770 | A1* | 9/2001 | Eian ............... C08F 265/04 428/402.22 |
| 2001/0049911 | A1 | 12/2001 | Swei |
| 2006/0265966 | A1 | 11/2006 | Rostal |
| 2009/0165394 | A1 | 7/2009 | Culler |
| 2009/0169816 | A1 | 7/2009 | Erickson |
| 2011/0101265 | A1 | 5/2011 | Kambara |
| 2011/0219703 | A1 | 9/2011 | Fuchs |
| 2011/0240340 | A1 | 10/2011 | Takanaga |
| 2012/0000135 | A1 | 1/2012 | Eilers |
| 2016/0068729 | A1 | 3/2016 | Erickson |
| 2017/0240788 | A1 | 8/2017 | Perez |
| 2017/0247546 | A1 | 8/2017 | Takahashi |

FOREIGN PATENT DOCUMENTS

| | | | |
|---|---|---|---|
| JP | 6169466 | 7/2017 | |
| WO | WO 93-12911 | 7/1993 | |
| WO | WO 99-14036 | 3/1999 | |
| WO | WO 01/10936 A1 * | 2/2001 | ............... C08F 2/44 |
| WO | WO 01-27215 | 4/2001 | |
| WO | WO 2005-056621 | 6/2005 | |
| WO | WO 2007-019229 | 2/2007 | |
| WO | WO 2010-074862 | 7/2010 | |
| WO | WO 2011-068678 | 6/2011 | |
| WO | WO 2016-196936 | 12/2016 | |
| WO | WO 2017-007673 | 1/2017 | |
| WO | WO 2019-180619 | 9/2019 | |

OTHER PUBLICATIONS

Chiu, "Surface modification of aluminum nitride by polysilazane and its polymer-derived amorphous silicon oxycarbide ceramic for the enhancement of thermal conductivity in silicone rubber composite", Applied Surface Science, Feb. 2014, vol. 292, pp. 928-936.
Choudhury, "Effect of Surface Modification of Aluminum Nitride on Electrical and Thermal Characterizations of Thermosetting Polymeric Nanocomposites", Poly Composites, Jan. 2013, vol. 34, pp. 1-14.
Guo, "Surface modification of AlN Powder by aluminum duhydrogen phosphate and phosphoric acid", Electronic Components and Materials, Feb. 2010, vol. 29, No. 2, pp. 37-40.
Iliashevsky, "Functionalization of Silica Surface with UV-Active molecules by Multivalent Organosilicon Spacer", Open Journal of Inorganic Chemistry, Jul. 2016, vol. 6, No. 3, pp. 163-174.
Kim, "Thermal and mechanical properties of AlN/BN-filled PVDF composite for solar cell backsheet application", Ceramics International, Jan. 2015, vol. 41, No. 1, pp. 179-187.
Kirk-Othmer, Encyclopedia of Chemical Technology, 347-386, (1983).
Li, "Surface modification of aluminium nitride powder", Journal of Materials Science Letter, Jan. 1996, No. 15, pp. 1758-1761.
Ma, "Thermal Conductivity Polypropylene/Aluminium Nitride Composites", Advanced Materials Research, Feb. 2011, vol. 194, pp. 1577-1580.
Ohashi, "Spherical Aluminum Nitride Fillers for Heat-Conducting Plastic Packages", Journal of the American Ceramic Society, Sep. 2005, vol. 88, No. 9, pp. 2615-2618.
Peng, "Electrical and thermophysical properties of epoxy/aluminum nitride nanocomposites: Effects of nanoparticle surface modification", Composites Part A: Applied Science and Manufacturing, Sep. 2010, vol. 41, No. 9, pp. 1201-1209.
Qian, "Efficient thermal properties enhancement to hyperbranched aromatic polyamide grafted aluminum nitride in epoxy composites", Polymers Advanced Technology, Jan. 2013, vol. 24, pp. 348-356.
Rottondi, "Optical Ring Metro Networks with Flexible Grid and Distance-Adaptive Optical Coherent Transceivers", Bell Labs Technical Journal, 2013, vol. 18, No. 3, pp. 95-110.
Wang, "Hydrolysis Control of AlN Powders for the Aqueous Processing of Spherical AlN Granules", Journal of the American Ceramic Society, May 2013, vol. 96, No. 5, pp. 1383-1389.
Wattanakul, "Effective Surface Treatments for Enhancing the Thermal Conductivity of BN-Filled Epoxy Composite", Journal of Applied Polymer Science, 2011, vol. 119, pp. 3234-3243.
Wereszczak, "Thermally Conductive MgO-filled Epoxy Molding Compounds", IEEE Transactions on Components, Packaging and Manufacturing Technology, 2013, vol. 3, No. 12, pp. 1994-2005.
Yang, "Thermal conductivity and dielectric properties of PEDOT:PSS-AlN filler reinforced water-soluble polymer composites", Ceramics International, Aug. 2017, vol. 43, No. 1, pp. S710-S716.
Yu, "Thermal conductivity of polystyrene-aluminum nitride composite", Composites Part A, Applied Science and Manufacturing, 2002, vol. 33, pp. 289-292, XP4320161.
Zhou, "The use of polyimide-modified aluminum nitride fillers in AlN@PI/Epoxy composites with enhanced thermal conductivity for electronic encapsulation", Scientific Reports, 2014, vol. 4, pp. 1-6.
Zhou, "Thermoplastic Polypropylene/Aluminum Nitride Nanocomposites with Enhanced Thermal Conductivity and Low Dielectric Loss", IEEE Transactions on Dielectrics and Electrical Insulation, Oct. 2016, vol. 23, No. 5, pp. 2768-2776.
International Search Report for PCT International Application No. PCT/IB2019/052236, dated Nov. 25, 2019, 5 pages.

\* cited by examiner

CHARGE-MODIFIED PARTICLES AND METHODS OF MAKING THE SAME

TECHNICAL FIELD

The present disclosure broadly relates to charge-modified particles and methods of making them.

BACKGROUND

Electrostatic coating is a widely used technology for depositing particles of various materials onto a substrate. In the process, a substrate is disposed in the electrostatic field generated between a charged plate, wire, or needle, and a grounded plate. Typically, the grounded plate is horizontally disposed above or below the charged plate in a parallel configuration. Particles are then introduced into between the electrodes and are propelled toward the down-facing surface of a substrate where they are adhered (e.g., by a curable resin layer). For example, in the manufacture of coated abrasive articles such as, for example, sandpaper, alumina particles are electrostatically deposited onto a curable resin layer, known as a make layer precursor, disposed on a backing.

However, not all materials are suitable for this technology. For example, boron nitride is poorly suited for electrostatic deposition processes. It would be desirable to have methods and materials for electrostatically depositing such materials.

SUMMARY

Advantageously, the present inventors have developed a coating for particles that enables them to be coated electrostatically, even when the particles are not suitable for electrostatic coating processes (e.g., as in the case of hexagonal boron nitride).

In one aspect, the present disclosure provides a charge-modified particle comprising the inorganic core and a shell surrounding the inorganic core, wherein the shell comprises a copolymer comprising monomeric units corresponding to free-radically polymerizable monomers, and wherein at least one of the monomeric units comprises a substituted benzotriazolylphenolate salt. The present disclosure also provides a plurality of the charge-modified particles.

In another aspect, the present disclosure provides a composition comprising a plurality of the charge-modified particles retained in an organic binder material.

In another aspect, the present disclosure provides a method comprising electrostatically coating the plurality of the charge-modified particles onto a substrate.

In another aspect, the present disclosure provides a method of making charge-modified particles, the method comprising:

providing an aqueous mixture of inorganic particles and surfactant;

adding at least one hydrophobic free-radically polymerizable monomer and a free-radically polymerizable substituted benzotriazole phenol the aqueous mixture to form a free-radically polymerizable mixture, wherein at least a portion of the at least one hydrophobic free-radically polymerizable monomer is disposed in a surfactant bilayer that is disposed on the particles;

adding a free-radical initiator to the free-radically polymerizable mixture thereby polymerizing at least a portion of the hydrophobic free-radically polymerizable monomer to form the charge-modified particles, each comprising the inorganic core and a shell surrounding the inorganic core, wherein the shell comprises a copolymer comprising monomeric units corresponding to the at least one hydrophobic free-radically polymerizable monomer and the free-radically polymerizable substituted benzotriazole phenol; and converting at least a portion of the monomeric units corresponding to the free-radically polymerizable substituted benzotriazole phenol into a substituted benzotriazolylphenolate salt.

As used herein:

the term "acrylic" means derived from or concerned with acrylic acid;

the term "aqueous" means containing a non-adventitious amount of water (e.g., at least 5 weight percent, at least 10 weight percent, at least 25 weight percent, at least 50 weight percent, up to and including 90 weight percent or even 100 percent water);

the term "inorganic" refers to materials that are free of carbon-hydrogen bonds (e.g., diamond, metal carbonates, metal sulfates, and metal carbides are included under the definition of inorganic);

the term "(meth)acryl" refers to acryl and/or methacryl;

the "monomeric unit" refers to a residue in a polymer chain corresponding to a monomer, or basic salt (e.g., a phenolate salt) of a monomer, used to form the polymer chain;

the term "shell" refers to a thin external layer enclosing a particle, wherein the layer has a thickness of less than the average thickness (e.g., less than 90 percent, less than 80 percent, less than 50 percent, less than 30 percent, or even less than 10 percent) of the charge-modified particle; and the term "surrounding" means extending on all sides of simultaneously, encircling.

Features and advantages of the present disclosure will be further understood upon consideration of the detailed description as well as the appended claims.

It should be understood that numerous other modifications and embodiments can be devised by those skilled in the art, which fall within the scope and spirit of the principles of the disclosure. The figure may not be drawn to scale.

DETAILED DESCRIPTION

Figure 1:
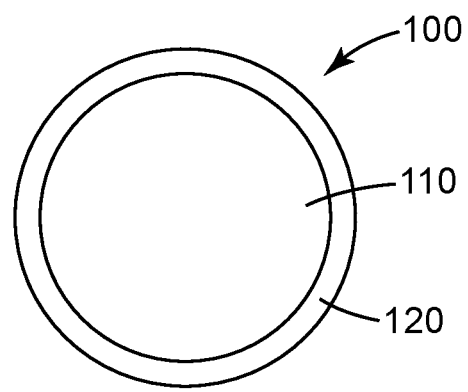
FIG. 1 is a schematic cross-sectional view of an exemplary charge-modified particle according to the present disclosure.

Referring now to FIG. 1, charge-modified particle 100 comprises an inorganic core 110 and shell 120 surrounding inorganic core 110. Shell 120 comprises a copolymer comprising monomeric units corresponding to free-radically polymerizable monomers, and wherein at least one of the monomeric units comprises a substituted benzotriazolylphenolate salt.

The inorganic core may comprise any inorganic material, typically water insoluble, preferably a glass, glass-ceramic, or ceramic material, although this is not a requirement.

In some embodiments, the inorganic core comprises an inorganic filler such as hexagonal boron nitride, metal carbonates and sulfates (e.g., barium carbonate, barium sulfate, magnesium carbonate, calcium carbonate, calcium sulfate, and magnesium sulfate), and silicates (such as talc and clays (e.g., montmorillonite)), metal particles, and combinations thereof.

In some embodiments, the inorganic core comprises an abrasive mineral, preferably selected from the group consisting of fused aluminum oxide, heat treated aluminum oxide, white fused aluminum oxide, black silicon carbide, green silicon carbide, titanium diboride, boron carbide, tungsten carbide, titanium carbide, tungsten, carbide, diamond, cubic boron nitride, garnet, fused alumina zirconia, sol-gel derived alumina, sol-gel derived zirconia, iron oxide, chromia, ceria, zirconia, titania, tin oxide, silica (such as quartz, glass beads, glass bubbles and glass fibers), silicates (such as talc, clays (e.g., montmorillonite), feldspar, mica), flint, emery, and combinations thereof. Examples of sol-gel derived alumina particles can be found in U.S. Pat. No. 4,314,827 (Leitheiser et al.), U.S. Pat. No. 4,623,364 (Cottringer et al.), U.S. Pat. No. 4,744,802 (Schwabel), U.S. Pat. No. 4,770,671 (Monroe et al.), and U.S. Pat. No. 4,881,951 (Monroe et al.). Typically, the mineral is crushed, but in some embodiments, the mineral may be shaped via molding process as described, for example, in U. S. Pat. Appln. Publ. Nos. 2009/0165394 A1 (Culler et al.), 2009/0169816 A1 (Erickson et al.), and 2016/0068729 A1 (Erickson et al.), resulting in a core having a predetermined shape. In some particularly preferred embodiments, the inorganic core comprises cubic boron nitride.

Other inorganic materials may also be used. Combinations of inorganic cores may also be used; e.g., resulting in a mixture of charge-modified particles having inorganic cores composed of different materials.

The inorganic cores and/or charge-modified particles may have any particulate size and distribution; however, the selection of material, size, and shape may influence the mechanical properties (e.g., abrading performance). For example, smaller particle sizes typically lead to lower inter-particle distance and greater packing density, while larger particles may allow for greater flowability. In some preferred embodiments, the mean particle size of the inorganic cores is from 0.1 to 100 microns, more preferably from 1 to 20 microns. Preferably, the inorganic cores and/or charge-modified particles have a monomodal particle size distribution, although polymodal (e.g., bimodal) size distributions may also be used.

If desired, one or more flow additives may be added to the inorganic cores (before coating with the shell) and/or charge-modified particles to aid in flowability of the loose particles. Exemplary flow additives for controlling flowability include fumed or precipitated silica or alumina, or nanoparticles of silica or alumina, although other metal oxide nanoparticles may also be used. As used herein, the term "nanoparticle" refers to particles having an average diameter of less than 1 micron. Further details concerning flow additives can be found in, for example, U.S. Pat. No. 8,894,466 (Jungbauer et al.).

The nanoparticles may be fully condensed. Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g., zirconia) nanoparticles have a high refractive index whereas amorphous nanoparticles typically have a lower refractive index.

The inorganic (e.g., metal oxide) nanoparticles are generally hydrophilic in nature. The nanoparticles are rendered hydrophobic upon being surface modified with a hydrophobic surface treatment.

Surface modification involves attaching surface modification agents to inorganic nanoparticles to modify the surface characteristics. In general, a surface treatment has a first end that will attach to the nanoparticle surface (covalently, ionically or through strong physisorption) and a second end that imparts steric stabilization that prevents the particles from agglomerating such as permanently fusing together. The inclusion of surface modification can also improve the compatibility of the nanoparticles with other materials.

Examples of surface treatment agents include alcohols, amines, carboxylic acids, sulfonic acids, phosphonic acids, silanes and titanates. The surface treatment may optionally comprise fluorine substituents. The preferred type of treatment agent is determined, in part, by the chemical nature of the (e.g., metal oxide) nanoparticle surface. Silanes are preferred for silica and for other siliceous fillers. Silanes and carboxylic acids are preferred for metal oxides such as zirconia. When an organosilane surface treatment is applied to metal oxide nanoparticles, the silane end is generally adsorbed by the nanoparticle. When a carboxylic acid is applied to a zirconia nanoparticle, the acid end is generally adsorbed by the zirconia.

Exemplary silanes include: alkyltrialkoxysilanes such as n-octyltrimethoxysilane, n-octyltriethoxysilane, isooctyltrimethoxysilane, dodecyltrimethoxysilane, octadecyltrimethoxysilane, propyltrimethoxysilane, and hexyltrimethoxysilane; [(meth)acryloxyalkyl]trialkoxysilanes such as (3-methacryloxypropyl)trimethoxysilane, (3-acryloxypropyl)trimethoxysilane, and (3-methacryloxypropyl)-triethoxysilane; [(meth)acryloxyalkyl]alkyldialkoxysilanes such as (3-methacryloxypropyl)methyl-dimethoxysilane and (3-acryloxypropyl)methyldimethoxysilane; [(meth)acryloxyalkyl]dialkylalkoxy-silanes such as (3-methacryloxypropyl)dimethylethoxysilane; mercaptoalkyltrialkoxylsilanes such as (3-mercaptopropyl)trimethoxysilane; aryltrialkoxysilanes such as (styrylethyl)trimethoxysilane, phenyltrimethoxysilane, phenyltriethoxysilane, and p-tolyltriethoxysilane; vinyl silanes such as vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltri-t-butoxysilane, vinyltris(isobutoxy)silane, vinyltriisoprope-noxysilane, and vinyltris(2-methoxyethoxy)silane; and combinations thereof.

Carboxylic acid surface modifying agents may comprise the reaction product of phthalic anhydride with an organic compound having a hydroxyl group. Suitable examples include, for example, phthalic acid mono-(2-phenylsulfany-lethyl) ester, phthalic acid mono-(2-phenoxyethyl) ester, or phthalic acid mono-[2-(2-methoxyethoxy)ethyl]ester. In some examples, the organic compound having a hydroxyl group is a hydroxyalkyl(meth)acrylate such as hydroxyethyl (meth)acrylate, hydroxypropyl(meth)acrylate, or hydroxybutyl (meth)acrylate. Examples include, but are not limited to, succinic acid mono-(2-acryloyloxyethyl) ester, maleic acid mono-(2-acryloyloxyethyl) ester, glutaric acid mono-(2-acryloyloxyethyl) ester, phthalic acid mono-(2-acryloyloxyethyl) ester, and phthalic acid mono-(2-acryloylbutyl) ester. Still others include mono-(meth)acryloxy polyethylene glycol succinate and the analogous materials made from maleic anhydride glutaric anhydride and phthalic anhydride.

Various other surface treatments are known in the art; for example, as described in PCT Publ. Nos. WO 2007/019229 (Baran et al.) and WO 2010/074862 (Jones et al.).

The surface treatment may comprise a blend of two or more hydrophobic surface treatments. For example, the surface treatment may comprise at least one surface treatment having a relatively long substituted or unsubstituted hydrocarbon group. In some embodiments, the surface treatment comprises at least one hydrocarbon group having at least 6 or 8 carbon atoms, such as isooctyltrimethoxysilane, with a second surface treatment that is less hydrophobic, such as methyl trimethoxy silane. The relatively long substituted or unsubstituted hydrocarbon group typically has no greater than about 20 carbons atoms.

The surface treatment may also comprise a blend of a hydrophobic surface treatment and (e.g., a small concentration of) a hydrophilic surface treatment, provided that the inclusion of such does not detract from the properties contributed by the hydrophobic nanoparticles.

The nanoparticles are typically surface modified prior to mixing the nanoparticles with the particles. The amount of surface modifier is dependent upon several factors such as nanoparticle size, nanoparticle type, molecular weight of the surface modifier, and modifier type. In general, it is preferred that approximately a monolayer of modifier is attached to the surface of the nanoparticle. The attachment procedure or reaction conditions also depend on the surface modifier used. For silanes it is preferred to surface treat at elevated temperatures under acidic or basic conditions for about 1-24 hour. Surface treatment agents such as carboxylic acids do not require elevated temperatures or extended time.

The surface modification of the nanoparticles in the colloidal dispersion can be accomplished in a variety of ways. The process involves the mixture of an inorganic dispersion with surface-modifying agents. Optionally, a co-solvent can be added at this point, such as for example, 1-methoxy-2-propanol, methanol, ethanol, isopropanol, ethylene glycol, N,N-dimethylacetamide, 1-methyl-2-pyrrolidinone, and mixtures thereof. The co-solvent can enhance the solubility of the surface modifying agents as well as the dispersibility of the surface-modified nanoparticles. The mixture of the inorganic dispersion with surface-modifying agents is subsequently reacted at room or an elevated temperature, with or without mixing.

The inorganic cores and/or charge-modified particles may be milled and/or sorted by size; e.g., corresponding to a specified nominal grade. In some preferred embodiments, the inorganic cores comprise an abrasive material and are sized to an abrasives industry recognized specified nominal grade.

Exemplary abrasive industry recognized grading standards include those promulgated by ANSI (American National Standards Institute), FEPA (Federation of European Producers of Abrasives), and JIS (Japanese Industrial Standard). Such industry accepted grading standards (i.e., abrasives industry recognized nominal grades) include, for example: ANSI 4, ANSI 6, ANSI 8, ANSI 16, ANSI 24, ANSI 30, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600; FEPA P8, FEPA P12, FEPA P16, FEPA P24, FEPA P30, FEPA P36, FEPA P40, FEPA P50, FEPA P60, FEPA P80, FEPA P100, FEPA P120, FEPA P150, FEPA P180, FEPA P220, FEPA P320, FEPA P400, FEPA P500, FEPA P600, FEPA P800, FEPA P1000, FEPA P1200; FEPA F8, FEPA F12, FEPA F16, and FEPA F24; and JIS 8, JIS 12, JIS 16, JIS 24, JIS 36, JIS 46, JIS 54, JIS 60, JIS 80, JIS 100, JIS 150, JIS 180, JIS 220, JIS 240, JIS 280, JIS 320, JIS 360, JIS 400, JIS 400, JIS 600, JIS 800, JIS 1000, JIS 1500, JIS 2500, JIS 4000, JIS 6000, JIS 8000, and JIS 10,000. More typically, the crushed aluminum oxide particles and the non-seeded sol-gel derived alumina-based abrasive particles are independently sized to ANSI 60 and 80, or FEPA F36, F46, F54 and F60 or FEPA P60 and P80 grading standards.

Alternatively, the inorganic cores can be graded to a nominal screened grade using U.S.A Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the shaped abrasive particles pass through a test sieve meeting ASTM E-11 specifications for the number 18 sieve and are retained on a test sieve meeting ASTM E-11 specifications for the number 20 sieve. In one embodiment, the shaped abrasive particles have a particle size such that most of the particles pass through an 18 mesh test sieve and can be retained on a 20, 25, 30, 35, 40, 45, or 50 mesh test sieve. In various embodiments, the shaped abrasive particles can have a nominal screened grade comprising: −18+20, −20/+25, −25+30, −30+35, −35+40, −40+45, −45+50, −50+60, −60+70, −70/+80, −80+100, −100+120, −120+140, −140+170, −170+200, −200+230, −230+270, −270+325, −325+400, −400+450, −450+500, or −500+635. Alternatively, a custom mesh size could be used such as −90+100.

The shell comprises an organic polymer comprising monomeric units corresponding to free-radically polymerizable monomers. At least one of the free-radically polymerizable monomeric units comprises a substituted benzotriazolylphenolate salt (e.g., corresponding to a substituted benzotriazolylphenol free-radically polymerizable monomer after polymerization and deprotonation with a metal alkoxide). Suitable free-radically polymerizable monomers may be monofunctional or polyfunctional with respect to the number of free-radically polymerizable groups.

In some preferred embodiments the organic polymer preferably includes, and more preferably consists at least essentially of, hydrophobic monomeric units, although this is not a requirement. Preferably, the organic polymer is at least essentially free (including free of) ionic and/or ionizable groups (e.g., quaternary ammonium ions, acid salts, and acid groups). In some preferred embodiments, the organic polymer is acrylic (i.e., contains at least one (meth)acrylic monomer unit).

The organic polymer may comprise monomeric units derived from free-radically polymerized monomers. Preferably, at least a portion of the monomeric units are derived from free-radically polymerized hydrophobic monomers. Exemplary suitable free-radically polymerizable monomers may include those having one free-radically polymerizable group, those having at least two free-radically polymerizable groups, and combinations thereof. In some preferred embodiments, the organic polymer comprises an acrylic polymer. In those embodiments, wherein the free-radically polymerizable monomers include monomers more than one free-radically polymerizable group, a crosslinked organic polymer generally results.

Exemplary free-radically polymerizable monomers having one free-radically polymerizable group include (meth) acrylamide, (meth)acrylic acid, (meth)acrylonitrile, 2-(2-ethoxyethoxy)ethyl (meth)acrylate, 2-ethylhexyl (meth) acrylate, 2-hydroxyethyl (meth)acrylate, tetrahydrofurfuryl (meth)acrylate, N,N-dimethylaminoethyl (meth)acrylate, 2-phenoxyethyl (meth)acrylate, 2-phenylethyl (meth)acrylate, caprolactone acrylate, cyclohexyl (meth)acrylate, dodecyl (meth)acrylate, ethoxylated phenoxyethyl (meth) acrylate, ethoxylated tetrahydrofurfuryl (meth)acrylate, hexyl (meth)acrylate, hydroxybutyl (meth)acrylate, hydroxyethyl (meth)acrylate, hydroxyisobutyl (meth)acrylate, hydroxyisopropyl (meth)acrylate, hydroxymethyl (meth)acrylate, hydroxypropyl (meth)acrylate, isobornyl (meth)acrylate, isobutyl (meth)acrylate, isodecyl (meth) acrylate, isononyl (meth)acrylate, isooctyl (meth)acrylate, lauryl (meth)acrylate, methyl (meth)acrylate, N-(n-dodecyl) (meth)acrylamide, N-(n-octadecyl) (meth)acrylamide, N-(tert-octyl) (meth)acrylamide, n-butyl (meth)acrylate, n-decyl (meth)acrylate, n-dodecyl (meth)acrylate, n-hexyl (meth)acrylate, n-octyl (meth)acrylate, nonylphenol ethoxylate (meth)acrylate, N-substituted (meth)acrylamide, N-vinyl-2-pyrrolidone, N-vinylcaprolactam, 2-vinylpyridine, 4-vinylpyridine, octyl (meth)acrylate, phenyl (meth)acrylate, stearyl (meth)acrylate, styrene and substituted styrenes, α-olefins (e.g., ethylene, propylene, butene, 1-hexene, and 1-octene), t-amyl (meth)acrylate, t-butyl (meth)acrylate, tetrahydrofurfuryl (meth)acrylate, tridecyl (meth)acrylate, undecyl (meth)acrylate, benzyl (meth)acrylate, vinyl esters (e.g., vinyl acetate and butyl acetate), vinyl ethers (e.g., ethyl vinyl ether, propyl vinyl ether, butyl vinyl ether), vinyl chloride, vinylidene dichloride, vinyltoluene, β-carboxyethyl (meth)acrylate, and combinations thereof.

Preferred hydrophobic monomers having one free-radically polymerizable group include 2-ethylhexyl (meth)acrylate, 2-phenoxyethyl (meth)acrylate, 2-phenylethyl (meth) acrylate, cyclohexyl (meth)acrylate, dodecyl (meth)acrylate, hexyl (meth)acrylate, isobornyl (meth)acrylate, isobutyl (meth)acrylate, isodecyl (meth)acrylate, isononyl (meth) acrylate, isooctyl (meth)acrylate, lauryl (meth)acrylate, methyl (meth)acrylate, N-(n-dodecyl) (meth)acrylamide, N-(n-octadecyl) (meth)acrylamide, N-(tert-octyl) (meth) acrylamide, n-butyl (meth)acrylate, n-decyl (meth)acrylate, n-dodecyl (meth)acrylate, n-hexyl (meth)acrylate, n-octyl (meth)acrylate, nonylphenol ethoxylate (meth)acrylate, octyl (meth)acrylate, phenyl (meth)acrylate, stearyl (meth) acrylate, styrene, t-amyl (meth)acrylate, t-butyl (meth)acrylate, tetrahydrofurfuryl (meth)acrylate, tridecyl (meth)acrylate, undecyl (meth)acrylate, $C_2$-$C_{18}$ alkyl vinyl ethers, and combinations thereof.

Exemplary monomers having at least two free-radically polymerizable groups include 1,1,1-trimethylolpropane tri (meth)acrylate, 1,4-butanediol di(meth)acrylate, 1,6-hexanediol di(meth)acrylate, 2,4-diethyl-1,5-pentanediol di(meth)acrylate, 2,4-diisopropyl-1,5-pentanediol di(meth) acrylate, 2,4-dimethyl-1,5-pentanediol di(meth)acrylate, 2,4-dipropyl-1,5-pentanediol di(meth)acrylate, 2-ethyl-4-isopropyl-1,5-pentanediol di(meth)acrylate, 2-ethyl-4-methyl-1,5-pentanediol di(meth)acrylate, 2-ethyl-4-propyl-1,5-pentanediol di(meth)acrylate, 2-isopropyl-4-methyl-1,5-pentanediol di(meth)acrylate, 2-isopropyl-4-propyl-1,5-pentanediol di(meth)acrylate, dipentaerythritol penta(meth) acrylate, divinylbenzene, ethoxylated trimethylolpropane tri (meth)acrylate, ethylene glycol di(meth)acrylate, glycerol tri(meth)acrylate, neopentyl glycol di(meth)acrylate, pentaerythritol tetra(meth)acrylate, pentaerythritol tri(meth) acrylate, tetraethylene glycol di(meth)acrylate, triethylene glycol di(meth)acrylate, trimethylolpropane tri(meth)acrylate, bis[2-(methacryloyloxy)ethyl] phosphate, and combinations thereof.

Preferred hydrophobic monomers having at least two free-radically polymerizable groups include divinylbenzene, 1,4-butanediol di(meth)acrylate, neopentyl glycol di(meth) acrylate, 1,6-hexanediol di(meth)acrylate, 2,4-dimethyl-1,5-pentanediol di(meth)acrylate, 2-ethyl-4-methyl-1,5-pentanediol di(meth)acrylate, 2,4-diethyl-1,5-pentanediol di(meth)acrylate, 2-ethyl-4-propyl-1,5-pentanediol di(meth) acrylate, 2,4-dipropyl-1,5-pentanedioldi(meth)acrylate, 2-isopropyl-4-methyl-1,5-pentanediol di(meth)acrylate, 2-ethyl-4-isopropyl-1,5-pentanediol di(meth)acrylate, 2,4-diisopropyl-1,5-pentanediol di(meth)acrylate, 2-isopropyl-4-propyl-1,5-pentanediol di(meth)acrylate, 1,1,1-trimethylolpropane tri(meth)acrylate, pentaerythritol tetra(meth) acrylate, dipentaerythritol penta(meth)acrylate, and combinations thereof.

Non-ionic at least partially fluorinated free-radically polymerizable monomers may also be used, although they may require fluorinated surfactant to be admicellar polymerizable. If used, they may be useful for providing hydrophobic properties.

Exemplary useful at least partially fluorinated free-radically polymerizable monomers include 2-propenoic acid, 2-[methyl[(nonafluorobutyl)sulfonyl]amino]ethyl ester; 2-propenoic acid, 2-methyl-, 2-[methyl[(nonafluorobutyl) sulfonyl]amino]ethyl ester; 1H,1H-heptafluoro-n-butyl (meth)acrylate; 1H,1H-pentafluoropropyl (meth)acrylate; 1,1,3-trihydroperfluorobutyl (meth)acrylate; 4,4'-(hexafluoroisopropylidene)diphenyl di(meth)acrylate; 3-(trifluoromethyl)benzyl (meth)acrylate; 1H,1H,2H,2H-nonafluorohexyl (meth)acrylate; 2,3,4,5,6-pentafluorostyrene; 3,4,5,6-tetraafluorostyrene; 2,4,5,6-tetraafluorostyrene; 2,3,5,6-tetraafluorostyrene; 3,4,5-trifluorostyrene; 2,3,4-trifluorostyrene; 2,4,5-trifluorostyrene; 2,4,6-trifluorostyrene; 2,3,5-trifluorostyrene; 2,3,6-trifluorostyrene; 2,3-difluorostyrene; 2,4-difluorostyrene; 2,6-difluorostyrene; 2,5-difluorostyrene; 3,4-difluorostyrene; 4-(trifluoromethyl)styrene; 3-(trifluoromethyl)styrene; 2-(trifluoromethyl)styrene; (4-trifluoromethyl)-2-fluorostyrene; 2,3-difluoro-4-(trifluoromethyl)styrene; 3,5-bis(trifluoromethyl)styrene; 2-fluoro-5-(trifluoromethyl)styrene; 2-fluoro-3-(trifluoromethyl)styrene; 2,4-difluoro-3-(trifluoromethyl)styrene; 4-hydroxy-2,3,5,6-tetrafluorostyrene; (4-trifluoromethyl)-2-fluorostyrene; 4-fluorostyrene; and 3-fluorostyrene.

Exemplary fluorinated surfactants include perfluoropolyether surfactants such as, for example, $CF_3OCF_2CF_2CF_2OCHFCF_2COO^-NH_4^+$ from 3M/Dyneon or $CF_3CF_2CF_2OCF(CF_3)COO^-NH_4^+$ from E. I. du Pont de Nemours and Co. (DuPont), Wilmington, Delaware Surfactants based on perfluorobutanesulfonic acid are also suitable, such as FC-4430, FC-4432, and FC-4434 available from 3M Company. Additional examples of fluorinated surfactants include $F(CF_2CF_2)_{1-9}CH_2CH_2SO_3Y$ where Y is a mixture of H+ and ammonium. These are known as Zonyl surfactants, and are available from DuPont. Anionic, cationic, amphoteric, and nonionic fluorinated surfactants are available from AGC Seimi Chemical Co., Ltd. as SURFLON S-211, SURFLON S-221, SURFLON S-241, and SURFLON S-241, respectively.

The organic polymer may include, and more preferably consist at least essentially of, hydrophobic monomeric units, although this is not a requirement. In these embodiments, the organic polymer is preferably at least essentially free (including free of) ionic and/or ionizable groups (e.g., quaternary ammonium ions, acid salts, and acid groups). In some preferred embodiments, the organic polymer is acrylic (i.e., contains at least one (meth)acrylic monomer unit).

The shell also comprises monomeric residue corresponding to a substituted benzotriazolylphenolate salt. Suitable substituted benzotriazolylphenolate salt can be made by deprotonation of the corresponding free-radically polymerizable benzotriazolylphenol using a base such as, for example, tetrabutylammonium hydroxide, sodium hydroxide, potassium hydroxide, lithium hydroxide, sodium hydride, sodium methoxide, or potassium ethoxide. Many of the foregoing free-radically polymerizable benzotriazolylphenols are commercially available, or can be synthesized by known methods.

Free-radically polymerizable benzotriazolylphenols include: 2-(2-hydroxy-5-vinylphenyl)-2H-benzotriazole; 2-(2-hydroxy-5-acrylyloxyphenyl)-2H-benzotriazole; 2-(2-hydroxy-3-methacrylamido methyl-5-tert-octylphenyl) benzotriazole; 2-(2'-hydroxy-5'-methacrylamidophenyl)-5-chlorobenzotriazole; 2-(2'-hydroxy-5'-methacrylamidophenyl)-5-methoxybenzotriazole; 2-(2'-hydroxy-5'-methacryloxypropyl-3'-t-butyl-phenyl)-5-chlorobenzotriazole; 2-(2'-hydroxy-5'-methacryloxypropylphenyl) benzotriazole; 2-hydroxy-5-methoxy-3-(5-(trifluoromethyl)-2H-benzo[d][1,2,3]triazol-2-yl)benzyl methacrylate (WL-1); 2-hydroxy-5-methoxy-3-(5-methoxy-2H-benzo[d][1,2,3]triazol-2-yl) benzyl methacrylate (WL-5); 3-(5-fluoro-2H-benzo[d][1,2,3]triazol-2-yl)-2-hydroxy-5-methoxybenzyl methacrylate (WL-2); 3-(2H-benzo[d][1,2,3]triazol-2-yl)-2-hydroxy-5-methoxybenzyl methacrylate (WL-3); 3-(5-chloro-2H-benzo[d][1,2,3]triazol-2-yl)-2-hydroxy-5-methoxybenzyl methacrylate (WL-4); 2-hydroxy-5-methoxy-3-(5-methyl-2H-benzo[d][1,2,3]triazol-2-yl)benzyl methacrylate (WL-6); 2-hydroxy-5-methyl-3-(5-(trifluoromethyl)-2H-benzo[d][1,2,3]triazol-2-yl)benzyl methacrylate (WL-7); 4-allyl-2-(5-chloro-2H-benzo[d][1,2,3]triazol-2-yl)-6-methoxyphenol (WL-8); 2-{2'-hydroxy-3'-tert-5'-[3"-(4"-vinylbenzyloxy)propoxy]phenyl}-5-methoxy-2H-benzotriazole; phenol, 2-(5-chloro-2H-benzotriazol-2-yl)-6-(1,1-dimethylethyl)-4-ethenyl-(UVAM); 2-(2'-hydroxy-5'-methacryloxyethylphenyl) benzotriazole (2-propenoic acid, 2-methyl-, 2-[3-(2H-benzotriazol-2-yl)-4-hydroxyphenyl]ethyl ester, Norbloc); 2-{2'-hydroxy-3'-tert-butyl-5'43'-methacryloyloxy propoxylphenyl}-5-methoxy-2H-benzotriazole (UV13); 2-[2'-hydroxy-3'-tert-butyl-5'-(3'-acryloyloxypropoxy)phenyl]-5-trifluoromethyl-2H-benzotriazole (CF3-UV13); 2-(2'-hydroxy-5-methacrylamidophenyl)-5-methoxybenzotriazole (UV6); 2-(3-allyl-2-hydroxy-5-methylphenyl)-2H-benzotriazole (UV9); 2-(2-hydroxy-3-methallyl-5-methylphenyl)-2H-benzotriazole (UV12); 2-3'-tert-butyl-2'-hydroxy-5'-(3"-dimethylvinylsilylpropoxy)-2'-hydroxyphenyl)-5-methoxybenzotriazole (UV15); 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A); 2-methylacrylic acid 3-[3-tert-butyl-5-(5-chlorobenzotriazol-2-yl)-4-hydroxyphenyl]-propyl ester (16-100, CAS #96478-15-8); 2-(3-(tert-butyl)-4-hydroxy-5-(5-methoxy-2H-benzo[d][1,2,3]triazol-2-yl)phenoxy)ethyl methacrylate (16-102); phenol, 2-(5-chloro-2H-benzotriazol-2-yl)-6-methoxy-4-(2-propen-1-yl) (CAS #1260141-20-5); 2-[2-hydroxy-5-[3-(methacryloyloxy)propyl]-3-tert-butylphenyl]-5-chloro-2H-benzotriazole; phenol, 2-(5-ethenyl-2H-benzotriazol-2-yl)-4-methyl-, homopolymer (9CI) (CAS No. 83063-87-0).

In some preferred embodiments, the free-radically polymerizable substituted benzotriazolylphenol is represented the formula

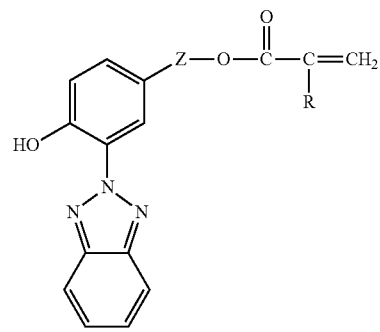

wherein

Z is an alkylene group having from 1 to 8 carbon atoms (e.g., methylene, ethylene, 1,3-propylene, 1,2-propylene, butylene, pentylene, hexylene, cyclohexylene, heptylene, or octylene), more preferably 2 to 4 carbon atoms; and R is H or methyl.

In some preferred embodiments, the free-radically polymerizable substituted benzotriazolylphenol is represented the formula

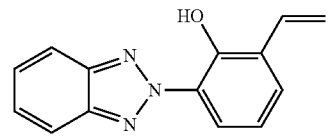 [SMILES: C=Cc1cccc(-n2nc3ccccc3n2)c1O]

Accordingly, in some preferred embodiments, the monomeric units corresponding to the free-radically polymerizable substituted benzotriazole phenol is represented the formula

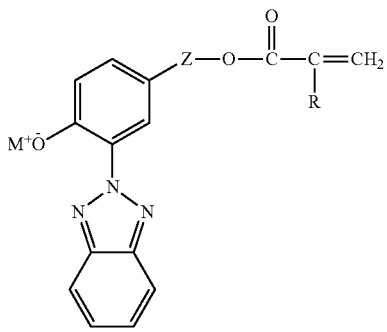

wherein

R and Z are as previously defined; and

M+ is an alkali metal cation (e.g., Li, Na, K, or Rb) or a quaternary ammonium ion having from 4 to 50 carbon atoms (e.g., tetramethylammonium, tetrabutylammonium, triethylphenylammonium, dodecyltriethylammonium, trimethyloctadecylammonium, or tetraoctadecylammonium), more preferably 4 to 30 carbon atoms.

In some preferred embodiments, the free-radically polymerizable substituted benzotriazolylphenol is represented the formula

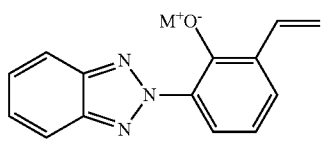

wherein M⁺ is as previously defined.

One or more free-radical initiators (e.g., thermal initiators, photoinitiators, and/or redox initiators) are used to polymerize the free-radically polymerizable monomers in the admicelle. Exemplary free-radical initiators include, for example, azo, peroxide, persulfate, and redox initiators. Suitable azo initiators include, for example, 2,2'-azobis(4-methoxy-2,4-dimethylvaleronitrile); 2,2'-azobis(2-amidinopropane) dihydrochloride; 2,2'-azobis(2,4-dimethylvaleronitrile); 2,2'-azobis(isobutyronitrile) (AIBN); 2,2'-azobis(2-methylbutyronitrile); and 1,1'-azobis(1-cyclohexanecarbonitrile); and 2,2'-azobis(methyl isobutyrate). Suitable peroxide initiators include, for example, benzoyl peroxide, acetyl peroxide, lauroyl peroxide, decanoyl peroxide, dicetyl peroxydicarbonate, di(4-t-butylcyclohexyl)-peroxydicarbonate; di(2-ethylhexyl)peroxydicarbonate; tert-butylperoxypivalate; tert-butylperoxy-2-ethylhexanoate; and dicumyl peroxide. Suitable persulfate initiators include, for example, potassium persulfate, sodium persulfate, and ammonium persulfate. Suitable redox (oxidation-reduction) initiators include, for example, combinations of the above persulfate initiators with reducing agents such as sodium metabisulfite and sodium bisulfate; systems based upon organic peroxides and tertiary amines, such as benzoyl peroxide plus dimethylaniline; and systems based on organic hydroperoxides and transition metals, such as cumene hydroperoxide plus cobalt naphthenate. Other free-radical initiators include, for example, pinacols, such as tetraphenyl-1,1,2,2-ethanediol. Preferred free-radical initiators include 2,2'-azobis(2-methylpropionamidine) dihydrochloride, sodium persulfate, potassium persulfate, and AIBN.

The free-radical initiator is present in an amount effective to polymerize the free-radically polymerizable monomers. Typical amounts are in the range of from about 0.01 parts to 10 parts, and more preferably in the range of from about 0.025 parts to about 2 parts by weight, based upon 100 total parts by weight of the total polymerizable composition. If a mixture of free-radical initiators is used, the total amount of the mixture of initiators would be as if a single free-radical initiator was used.

Charge-modified particles according to the present disclosure can be made by any suitable method. One preferred method for making the charge-modified particles is by admicellar polymerization. Admicellar polymerization involves the following steps.

The first step involves formation of admicelles on a substrate in the presence of a (typically) aqueous liquid containing surfactant. An admicelle, in simple terms, is the formation of bilayer of surfactant molecules on the substrate. Formation of the bilayers may be simultaneous or through a step-by-step process in which a monolayer is formed adjacent to the fabric surface first and then the upper layer gets formed onto it.

When physically adsorbed on solid surfaces at a polar solid-polar liquid interface, surfactant molecules form micelle-like bilayered surfactant aggregates, called admicelles. In the first surfactant layer of an admicelle, polar portions of the surfactant molecules are adsorbed onto the polar solid surface while the nonpolar portions are oriented away from the solid surface. In the second surfactant layer of the admicelle, nonpolar portions of the surfactant molecules are oriented toward the nonpolar portions of the surfactant molecules of the first layer and the polar portions are oriented toward the polar liquid phase. Just as micelles can incorporate other molecules into their structure in the phenomenon termed solubilization, so admicelles exhibit an analogous behavior which is referred to as adsolubilization. If the surfactant is amphipathic, that is, the surfactant molecule has both a polar end and a nonpolar end and is big enough for each end to display its own solubility behavior, the surfactant may be regarded as having a polar head and a nonpolar tail. An admicelle of such surfactant may be considered as composed of two layers of the surfactant molecules where the tails of one layer are oriented tail-to-tail with the tails of the other layer and where the heads of one layer are adsorbed onto the solid polar surface. The heads of the other layer are oriented toward the polar liquid phase.

The surfactants which can be used to form admicelles are numerous and widely varied and include anionic surfactants, cationic surfactants, nonionic surfactants, and zwitterionic surfactants. Lists of exemplary surfactants can be found in, for example, Kirk-Othmer, *Encyclopedia of Chemical Technology*, Third Edition, Volume 22, John Wiley & Sons, New York (1983), pages 347-386.

Examples of cationic surfactants that can be used include quaternary ammonium salts, ethoxylated quaternary ammonium salts, and combinations thereof. Examples include cetyltrimethylammonium bromide, cetyltrimethylammonium chloride, tallowtrimethylammonium chloride, myristyltrimethylammonium bromide, N-laurylpyridinium chloride, dicocodimethylammonium chloride, distearyldimethylammonium chloride, di(hydrogenated tallow)dimethylammonium chloride, and stearylbenzyldimethylammonium chloride), behentrimonium chloride, benzalkonium chloride, benzethonium chloride, benzododecinium bromide, carbethopendecinium bromide, cetalkonium chloride, cetrimonium bromide, cetrimonium chloride, cetylpyridinium chloride, didecyldimethylammonium chloride, dimethyldioctadecylammonium bromide, dimethyldioctadecylammonium chloride, pyridinium salts (e.g., hexadecyl pyridinium chloride), stearalkonium chloride, and tetramethylammonium hydroxide.

Examples of nonionic surfactants include alcohol ethoxylates such as laurylethoxylate (3 EO), laurylethoxylate (7 EO), laurylethoxylate (23 EO), cetylethoxylate (10 EO), cetylethoxylate (20 EO), stearylethoxylate (10 EO), stearylethoxylate (20 EO), oleylethoxylate (20 EO), and tallowethoxylate (30 EO); alkylphenol ethoxylates such as octylphenylethoxylate (5 EO), octylphenylethoxylate (10 EO), octylphenylethoxylate (30 EO), nonylphenylethoxylate (8 EO), nonylphenylethoxylate (10 EO), nonylphenylethoxylate (15 EO), nonylphenylethoxylate (20 EO), nonylphenylethoxylate (30 EO), and dodecylphenylethoxylate (10 EO); poly(oxyethylene-co-oxypropylene)s such as those in which poly(propylene oxide) is ethoxylated and those in which poly(ethylene oxide) is propoxylated; poly(ethylene glycol) esters of fatty acids; poly(oxyethylene) esters of rosin, tall oil, or fatty acid; and sorbitan esters of tall oil or fatty acid.

In some preferred embodiments, the surfactant comprises at least one of cationic or nonionic surfactant.

The amount of surfactant in the solution can be widely varied. In most cases, the surfactant constitutes from 0.01 to 10 weight percent of the liquid phase of the composition in which admicellar polymerization is to be carried out. Often the surfactant constitutes from 0.05 to 2 weight percent of the solution, and in many cases, 0.1 to 1 weight percent of surfactant is preferred.

The second step involves adsolubilization. The concentration of the surfactant at which micelle-like aggregates start forming at the solid/liquid interface is termed as the critical admicelle concentration (CAC) or critical hemimicelle concentration (CHC). Free-radically polymerizable monomers and optionally free-radical initiator are adsolubilized into the admicelle at this stage.

The third step involves polymerization. Polymerization takes place within the monomers adsolubilized in the admicelle.

An optional, but typical fourth step includes solvent removal of the outer upper layer of surfactant and traces of unreacted monomer and optionally some of the bottom layer.

Accordingly, the present disclosure provides a method in which particles are provided as an acidic aqueous dispersion. Preferably the pH is between 6 and 1, more preferably between 5 and 2, and more preferably between 4 and 2, wherein all of the foregoing pH ranges are inclusive of their endpoints. The acidic aqueous dispersion of particles also includes at least one surfactant; preferably including anionic and/or nonionic surfactant, although other surfactants may also be used.

Next, at least one hydrophobic free-radically polymerizable monomer and a soluble free-radical initiator monomer is added to the aqueous acidic mixture (e.g., with vigorous stirring) to form a free-radically polymerizable mixture, with at least a portion of the at least one hydrophobic free-radically polymerizable monomer is disposed in a surfactant bilayer that is disposed on the particles.

After this step at least one free-radical initiator is introduced into the free-radically polymerizable mixture thereby polymerizing at least a portion of the hydrophobic free-radically polymerizable monomer to form the charge-modified particles, each comprising an inorganic core and a shell surrounding the inorganic core, wherein the shell comprises an organic polymer.

Afterward, charge-modified particles may be isolated, and optionally at least the outer layer and some of the inner layer of surfactant removed from them by washing with a suitable solvent (e.g., water/ethanol).

Admicelles may be induced to form above, at, or below the critical micelle concentration (CMC) of the surfactant, which is typically dependent on factors such as, for example, pH, temperature, and ionic strength of the aqueous acidic mixture. Selection of appropriate parameters will be apparent to those of skill in the art. Additional guidance concerning admicellar polymerization can be found in U.S. Pat. Nos. 5,106,691 and 5,426,136 (both to Harwell et al.). Irrespective of the surfactant concentration relative to the CMC when they are formed, it is preferred that at equilibrium the surfactant concentration be below the CMC. There are two main advantages for this, both based upon the lack of micelles in the liquid. First, the substantial absence of micelles in the liquid tends to concentrate monomer in the admicelles. Second, the substantial absence of micelles in the liquid encourages a low concentration of monomer in the liquid and hence discourages monomer polymerization in the liquid. Again, although it is not desired to be bound by any theory, it is believed that admicelles can exist and be formed below the CMC because the solid surface provides an environment more favorable to admicelle formation than the liquid provides for micelle formation.

Admicelle formation on polar solid surfaces may be induced at surfactant concentrations below the CMC by manipulation of the identity of the surfactant, solution pH, and counterion concentration. To obtain admicelle formation, the most critical parameters to be manipulated are the solution pH and the identity and type of surfactant employed. As the pH of the surfactant solution is progressively lowered below the PZC, the polar solid surface becomes progressively more protonated and more positively charged. Conversely, as the pH of the surfactant solution is progressively increased above the point of zero charge (PZC), the solid surface becomes progressively more negatively charged. Anionic surfactants are therefore more readily adsorbed by polar solid surfaces to form admicelles at values of surfactant solution pH below the PZC while cationic surfactants are more readily adsorbed to form admicelles at values of surfactant solution pH above the PZC. The PZC does not represent a sharp discontinuity, however, for admicelles of anionic surfactants can be formed at and somewhat above the PZC and admicelles of cationic surfactants can be formed at and somewhat below the PZC. Nonionic surfactants are adsorbed by polar solid surfaces to form admicelles at, above, and below the PZC.

The solvent of the surfactant solution is generally aqueous. Water may be used alone but in many instances a mixture of water and at least one organic polar cosolvent is used. Examples of polar compounds that can be used as cosolvents include methanol, ethanol, n-propanol, isopropanol, n-butanol, isobutanol, sec-butanol, tert-butanol, n-pentanol, ethylene glycol, 2-methoxyethanol, 2-ethoxyethanol, acetone, methyl ethyl ketone, methyl acetate, ethyl acetate, and acetonitrile. A single organic polar cosolvent or a mixture of organic polar cosolvents may be used. One preferred solvent of the surfactant solution is a mixture of water and ethanol.

The temperature during admicelle formation may be any temperature where a liquid solution can be maintained. In most instances, the temperature is in the range of from $-10°$ C. to $+90°$ C. Preferably the temperature is in the range of from $0°$ C. to $40°$ C. The pressure during admicelle formation may be subatmospheric, ambient atmospheric, or superatmospheric, as desired.

As will be more fully developed below, the process for forming admicelles is conducted such that as equilibrium is approached, the concentration of the surfactant in the liquid phase is preferably below the critical micelle concentration. At such concentrations the admicelle formation over the surface will be patchwise. Admicelle formation which substantially completely covers and is substantially coextensive with the particulate amorphous silica surface can be accomplished. In order to achieve this, however, the concentration of the surfactant in the surfactant solution must ordinarily be above or at the CMC or, if below the CMC, very near to it. It may be advantageous to minimize or even eliminate the presence of micelles in the liquid phase during the polymerization of monomer, and since there may be little or no advantage in having the particles substantially completely covered with polymer film, patchwise formation of admicelles may be preferred.

Free-radically polymerizable monomers may be introduced to the system after formation of the admicelles or it may be present during their formation. The admicelles may be viewed as a two-dimensional solvent in which monomer can be adsolubilized.

The amount of free-radically polymerizable monomer in the liquid phase can be widely varied. In most cases the monomer constitutes from 0.01 to 10 weight percent of the liquid phase. Often the monomer constitutes from 0.05 to 5 weight percent of the solution. From 0.1 to 1 weight percent is preferred.

The surfactant, monomer, and free-radical initiator can be introduced to the solution simultaneously or sequentially and in any order. In most cases it will be preferred to dissolve and/or disperse the surfactant, monomer, and initiator in the liquid phase.

Although it is preferable for the surfactant concentration in the liquid phase to be below the CMC when the monomer is polymerized, it is also preferable that the surfactant concentration of the solution be above the CMC when the solution is brought into contact with the particles. This procedure is especially preferred when nonpolar monomer is also a component of the solution. Once the solution is brought into contact with the particles, admicelle formation removes surfactant from the liquid phase so that as equilibrium is approached the concentration of the surfactant in the liquid phase is below the CMC. Adsolubilization of the monomer similarly reduces the monomer concentration in the liquid phase or, if additional monomer is introduced to the system, allows further quantities of monomer to be dissolved.

The temperature during polymerization may be any temperature where the monomer or monomers are customarily polymerized. In most instances the temperature is in the range of from −10° C. to 95° C. Preferably, the temperature is in the range of from 40° C. to 90° C. When the temperature is above ambient temperature, the reaction may be commenced by thermal decomposition of the initiator.

Following polymerization of the monomer, the charge-modified particles may be separated from the liquid and then dried (i.e., isolated). Optionally, the charge-modified particles may be washed with water or other polar solvent prior to final drying. Such washing may be beneficial because it removes at least some of the surfactant residue which would otherwise be present.

Charge-modified particles are suitable for incorporating into an organic binder material to form various compositions comprising a plurality of charge-modified particles according to the present disclosure retained in an organic binder material.

Suitable organic binder materials may include thermoplastic and/or thermosetting materials. In some embodiments, the organic binder materials comprise an adhesive (e.g., a hot-melt and/or pressure-sensitive adhesive).

Suitable thermoplastic materials may include polyurethanes, polyamides, polyolefins (for example, polyethylene, polypropylene and compounded blends thereof which may include thermoplastic elastomeric materials such as ethylene-propylene elastomer), polyesters, and combinations thereof. These materials may also comprise one or more additives, including but not limited to fillers, fibers, antistatic agents, lubricants, wetting agents, pigments, dyes, coupling agents, plasticizers, and suspending agents.

Suitable thermosetting materials may include, for example, cyanate resins, phenolic resins, urea-formaldehyde resins, melamine-formaldehyde resins, benzoxazines, oxetanes, polyimides, silicone resins, urethane resins, (meth) acrylates, polyester resins, aminoplast resins having pendant alpha, beta-unsaturated carbonyl groups, epoxy resins, acrylated urethane, acrylated epoxies, combinations of the foregoing, and polymerized reaction products of the foregoing. For thermosettable materials that require a curative (e.g., catalyst, initiator, and/or hardener), one is typically included in the composition before curing; generally, in an effective amount to cause thermosetting. The choice of curative and amount will be readily ascertainable by those of ordinary skill in the art.

The amount of charge-modified particles is preferably from 10 to 2000 parts by weight, preferably 20 to 200 parts by weight, relative to 100 parts by weight of the weight of the organic binder material, although other amounts may also be used.

Various kinds of additives may be added to compositions according to the present disclosure. Examples of additives include crosslinking agents, tackifiers, antioxidants, chain-transfer agents, plasticizers, flame retardants, flame retarding synergists, precipitation inhibitors, thickeners, thixotropic agents such as ultra-fine silica powder, colorants, electrically conductive particles, antistatic agents, and surface-treating agents, and combinations of the foregoing.

Charge-modified particles may be used in conventional electrostatic coating processes, and especially those in which the inorganic core is not particularly susceptible to electrostatic coating methods. One such particle is cubic boron nitride, which is useful in manufacture of coated abrasive articles. Details of manufacture of coated abrasive articles by electrostatically coating the abrasive mineral are well known and can be found in, for example, U.S. Pat. No. 5,766,277 (Dahlke et al.), U.S. Pat. No. 8,771,801 (Moren et al.) and U.S. Pat. No. 8,869,740 (Moren et al.), and in U. S. Pat. Appl. Publ. Nos. 2012/0000135 A1 (Eilers et al.) and 2006/0265966 (Rostal et al.).

Accordingly, in one embodiment of the present disclosure, the coated abrasive article has an abrasive layer comprises make and size layers and abrasive particles.

Figure 2:
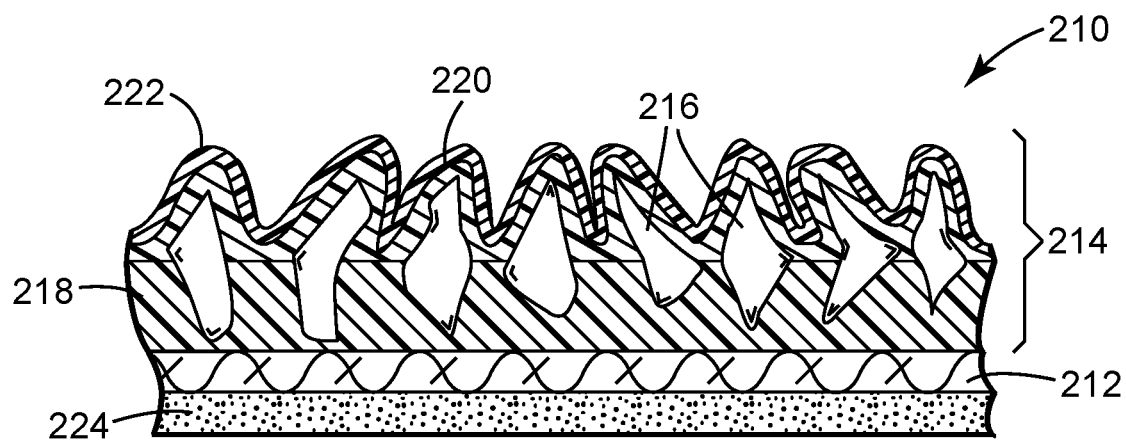
FIG. 2 is a schematic side view of an exemplary coated abrasive article according to the present disclosure.

FIG. 2 illustrates an exemplary coated abrasive article 210 according to the present disclosure comprising a backing 212 having an abrasive layer 214 bonded thereto. Backing 212 may be a conventional, sealed coated abrasive backing or a porous, non-sealed backing. Backing 212 may be comprised of cloth, vulcanized fiber, paper, nonwoven materials, fibrous reinforced thermoplastic backing, polymeric films, substrates containing hooked stems, looped fabrics, metal foils, mesh, foam backings, and laminated multilayer combinations thereof. Cloth backings can be untreated, saturated, pre-sized, backsized, porous, or sealed, and they may be woven or stitch bonded. Cloth backings may include fibers or yarns of cotton, polyester, rayon, silk, nylon or blends thereof. Cloth backings can be provided as laminates with different backing materials described herein.

Paper backings also can be saturated, barrier coated, pre-sized, backsized, untreated, or fiber-reinforced. The paper backings also can be provided as laminates with a different type of backing material. Nonwoven backings include scrims and laminates to different backing materials mentioned herein. The nonwovens may be formed of cellulosic fibers, synthetic fibers or blends thereof.

Polymeric backings include polyolefin or polyester films. The polymeric backings can be provided as blown film, or as laminates of different types of polymeric materials, or laminates of polymeric films with a non-polymeric type of backing material. The backing can also be a stem web used alone or incorporating a nonwoven, or as a laminate with a different type of backing. The loop fabric backing can be brushed nylon, brushed polyester, polyester stitched loop, and loop material laminated to a different type of backing material. The foam backing may be a natural sponge material or polyurethane foam and the like. The foam backing also can be laminated to a different type of backing material. The mesh backings can be made of polymeric or metal open-weave scrims. Additionally, the backing may be a belt such as that disclosed in PCT Publ. No. WO 93/12911 (Benedict et al.), or a reinforced thermoplastic backing that is disclosed in U.S. Pat. No. 5,417,726 (Stout et al.).

Optional adhesive layer 224 may be disposed on backing 212 opposite abrasive layer 214.

Abrasive layer 214 comprises a multiplicity of charge-modified abrasive particles 216 which are bonded to a major surface of backing 212 by a first binder or make layer (or make coat) 218. A second binder or size layer (or size coat) 220 is applied over the charge-modified abrasive particles and the make layer to reinforce the particles. The abrasive particles typically have a size of about 0.1 to 1500 microns, more preferably from about 1 to 1300 microns. Examples of useful abrasive materials that may comprise the inorganic core for these applications may include fused aluminum oxide based materials such as aluminum oxide, ceramic aluminum oxide (which may include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet and blends thereof.

The first binder is formed from a first binder precursor. The term "precursor" means the binder is uncured and not crosslinked. The term "crosslinked" means a material having polymeric sections that are interconnected through chemical bonds (i.e., interchain links) to form a three-dimensional molecular network. Thus, the first binder precursor is in an uncured state when applied to the backing. In general, the first binder comprises a cured or crosslinked thermosetting polymer. For purposes of this application, "cured" and "polymerized" can be used interchangeably. However, with the appropriate processing conditions and optional catalysts, the first binder precursor is capable of crosslinking to form a thermosetting binder. For purposes of this invention, the first binder precursor is "energy-curable" in the sense that it can crosslink (i.e., cures) upon exposure to radiation, e.g., actinic radiation, electron beam radiation, and/or thermal radiation. Additionally, under the appropriate processing condition 3, the first binder precursor is a hot melt pressure sensitive adhesive. For example, depending upon the chemistry, at room temperature the first binder precursor may be a solid. For instance, the first binder precursor may be a solid film that is transfer coated to the backing. Upon heating to elevated temperature, this first binder precursor is capable of flowing, increasing the tack of the hot melt pressure sensitive adhesive. Alternatively, for instance, if the resin is solvent-borne, the first binder precursor may be liquid at room temperature.

Size layer 220 is applied over abrasive particles 216 and make layer 218. The size layer may comprise a glue or a cured resinous adhesive. Examples of suitable resinous adhesives include phenolic, aminoplast resins having pendant $\alpha,\beta$-unsaturated groups, urethane, acrylated urethane, epoxy, acrylated epoxy, isocyanurate, acrylated isocyanurate, ethylenically-unsaturated, urea-formaldehyde, melamine formaldehyde, bis-maleimide and fluorene-modified epoxy resins as well as mixtures thereof. Precursors for the size layer may further include catalysts and/or curing agents to initiate and/or accelerate the curing process described hereinbelow. The size layer is selected based on the desired characteristics of the finished coated abrasive article.

Both the make and size layers may additionally comprise various optional additives such as fillers, grinding aids, fibers, lubricants, wetting agents, surfactants, pigments, antifoaming agents, dyes, coupling agents, plasticizers and suspending agents so long as they do not adversely affect the pressure sensitive adhesive properties of the make layer (before it fully cures) or detrimentally effect the ability of the make or size layers to cure upon exposure to energy. Additionally, the incorporation of these additives, and the amount of these additives should not adversely affect the rheology of the binder precursors. For example, the addition of too much filler can adversely affect processability of the make layer.

Abrasive layer 214 may further comprise an optional third binder or supersize layer 222. One type of useful supersize layering includes a grinding aid, such as potassium tetrafluoroborate, and an adhesive, such as an epoxy resin. Supersize layer 222 may be included to prevent or reduce the accumulation of swarf (the material abraded from a workpiece) between abrasive particles which can dramatically reduce the cutting ability of the abrasive article. Materials useful in preventing swarf accumulation include metal salts of fatty acids (e.g., zinc stearate or calcium stearate), salts of phosphate esters (e.g., potassium behenyl phosphate), phosphate esters, urea-formaldehyde resins, waxes, mineral oils, crosslinked silanes, crosslinked silicones, fluorochemicals and combinations thereof.

SELECT EMBODIMENTS OF THE PRESENT DISCLOSURE

In a first embodiment, the present disclosure provides a charge-modified particle comprising the inorganic core and a shell surrounding the inorganic core, wherein the shell comprises a copolymer comprising monomeric units corresponding to free-radically polymerizable monomers, and wherein at least one of the monomeric units comprises a substituted benzotriazolylphenolate salt.

In a second embodiment, the present disclosure provides a charge-modified particle according to the first embodiment, wherein the shell is covalently crosslinked.

In a third embodiment, the present disclosure provides a charge-modified particle according to the first or second embodiment, wherein the shell further comprises surfactant.

In a fourth embodiment, the present disclosure provides a charge-modified particle according to any one of the first to third embodiments, wherein at least a portion of the free-radically polymerizable monomers are hydrophobic.

In a fifth embodiment, the present disclosure provides a charge-modified particle according to any one of the first to fourth embodiments, wherein the copolymer is acrylic.

In a sixth embodiment, the present disclosure provides a charge-modified particle according to any one of the first to fifth embodiments, wherein the copolymer is a copolymer of styrene and at least one hydrophobic (meth)acrylic monomer.

In a seventh embodiment, the present disclosure provides a charge-modified particle according to any one of the first to sixth embodiments, wherein the substituted benzotriazolylphenolate salt is represented by the formula

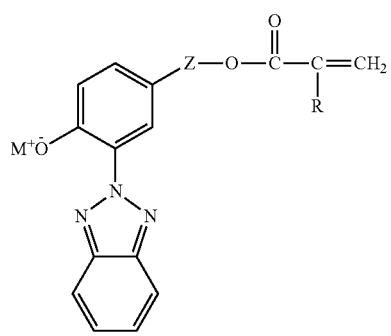

wherein
Z is an alkylene group having from 1 to 8 carbon atoms;
R is H or methyl; and
$M^+$ is an alkali metal cation or a quaternary ammonium ion having from 4 to 50 carbon atoms.

In an eighth embodiment, the present disclosure provides a charge-modified particle according to any one of the first to seventh embodiments, wherein the inorganic core comprises boron nitride.

In a ninth embodiment, the present disclosure provides a plurality of charge-modified particles according to any one of the first to eighth embodiments.

In a tenth embodiment, the present disclosure provides a plurality of charge-modified particles according to the ninth embodiment, further comprising a flow additive comprising at least one of fumed or precipitated silica, fumed or precipitated alumina, silica nanoparticles, or alumina nanoparticles.

In an eleventh embodiment, the present disclosure provides a composition comprising the plurality of charge-modified particles according to the ninth or tenth embodiment retained in an organic binder material.

In a twelfth embodiment, the present disclosure provides a method comprising electrostatically coating a composition according to the eleventh embodiment onto a substrate.

In a thirteenth embodiment, the present disclosure provides a method comprising electrostatically coating the plurality of charge-modified particles according to the twelfth embodiment, wherein the substrate comprises a curable make layer precursor disposed on a backing.

In a fourteenth embodiment, the present disclosure provides a method according to the twelfth or thirteenth embodiment, wherein the charge-modified particles comprise boron nitride.

In a fifteenth embodiment, the present disclosure provides a method of making charge-modified particles, the method comprising:
providing an aqueous mixture of inorganic particles and surfactant;
adding at least one hydrophobic free-radically polymerizable monomer and a free-radically polymerizable substituted benzotriazole phenol the aqueous mixture to form a free-radically polymerizable mixture, wherein at least a portion of the at least one hydrophobic free-radically polymerizable monomer is disposed in a surfactant bilayer that is disposed on the particles;
adding a free-radical initiator to the free-radically polymerizable mixture thereby polymerizing at least a portion of the hydrophobic free-radically polymerizable monomer to form the charge-modified particles, each comprising the inorganic core and a shell surrounding the inorganic core, wherein the shell comprises a copolymer comprising monomeric units corresponding to the at least one hydrophobic free-radically polymerizable monomer and the free-radically polymerizable substituted benzotriazole phenol; and
converting at least a portion of the monomeric units corresponding to the free-radically polymerizable substituted benzotriazole phenol into a substituted benzotriazolylphenolate salt.

In a sixteenth embodiment, the present disclosure provides a method according to the fifteenth embodiment, further comprising isolating the charge-modified particles.

In a seventeenth embodiment, the present disclosure provides a method according to the fifteenth or sixteenth embodiment, wherein the shell further comprises the surfactant.

In an eighteenth embodiment, the present disclosure provides a method according to any one of the fifteenth to seventeenth embodiments, wherein the shell comprises a organic polymer.

In a nineteenth embodiment, the present disclosure provides a method according to the eighteenth embodiment, wherein the organic polymer comprises an acrylic polymer.

In a twentieth embodiment, the present disclosure provides a method according to any one of the fifteenth to nineteenth embodiments, wherein the at least one hydrophobic free-radically polymerizable monomer comprises at least one of styrene, N-(n-octadecyl) (meth)acrylamide, t-amyl (meth)acrylate, t-butyl (meth)acrylate, cyclohexyl (meth)acrylate, isodecyl (meth)acrylate, n-decyl (meth)acrylate, n-dodecyl (meth)acrylate, N-(n-dodecyl)(meth)acrylamide, n-hexyl (meth)acrylate, n-octyl (meth)acrylate, N-(tert-octyl)(meth)acrylamide, 2-phenoxyethyl (meth)acrylate, phenyl (meth)acrylate, 2-phenylethyl (meth)acrylate, stearyl (meth)acrylate, undecyl (meth)acrylate, isobornyl (meth)acrylate, tridecyl (meth)(meth)acrylate, 1,4-butanediol di(meth)acrylate, or neopentyl glycol di(meth)acrylate.

In a twenty-first embodiment, the present disclosure provides a method according to any one of the fifteenth to twentieth embodiments, wherein the at least one hydrophobic free-radically polymerizable monomer comprises a monomer having at least two free-radically polymerizable groups.

In a twenty-second embodiment, the present disclosure provides a method according to the twentieth embodiment, wherein the monomer having at least two free-radically polymerizable groups comprises at least one of divinylbenzene, 1,6-hexanediol di(meth)acrylate, 2,4-dimethyl-1,5-pentanediol di(meth)acrylate, 2-ethyl-4-methyl-1,5-pentanediol di(meth)acrylate, 2,4-diethyl-1,5-pentanediol di(meth)acrylate, 2-ethyl-4-propyl-1,5-pentanediol di(meth)acrylate, 2,4-dipropyl-1,5-pentanedioldi(meth)acrylate, 2-isopropyl-4-methyl-1,5-pentanediol di(meth)acrylate, 2-ethyl-4-isopropyl-1,5-pentanediol di(meth)acrylate, 2,4-diisopropyl-1,5-pentanediol di(meth)acrylate, 2-isopropyl-4-propyl-1,5-pentanediol di(meth)acrylate, 1,1,1-trimethylolpropane tri(meth)acrylate, pentaerythritol tetra(meth)acrylate, bis[2-(methacryloyloxy)ethyl] phosphate, 2-ethylhexyl (meth)acrylate or dipentaerythritol penta(meth)acrylate.

In a twenty-third embodiment, the present disclosure provides a method according to any one of the fifteenth to twenty-second embodiments, wherein the substituted benzotriazolylphenolate salt is represented by the formula

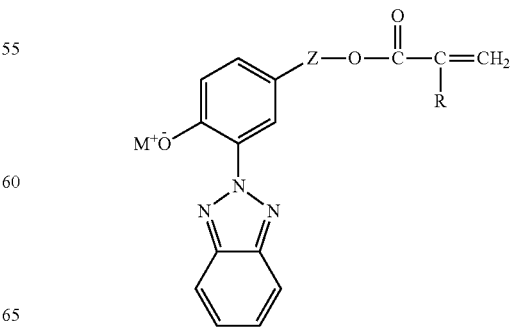

wherein
Z is an alkylene group having from 1 to 8 carbon atoms;
R is H or methyl; and
M⁺ is an alkali metal cation or a quaternary ammonium ion having from 4 to 50 carbon atoms.

In a twenty-fourth embodiment, the present disclosure provides a method according to any one of the fifteenth to twenty-third embodiments, wherein the inorganic particles comprise boron nitride.

In a twenty-fifth embodiment, the present disclosure provides a method according to any one of the fifteenth to twenty-fourth embodiments, further comprising adding flow additive to the inorganic particles before adding the adding at least one hydrophobic free-radically polymerizable monomer and a free-radically polymerizable substituted benzotriazole phenol the aqueous mixture, wherein the flow additive comprises at least one of fumed or precipitated silica, fumed or precipitated alumina, silica nanoparticles, or alumina nanoparticles.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

In the Tables, "mM" means millimolar, "NM" means not measured, and "NA" means not applicable.

TABLE 1

| DESIGNATION | DESCRIPTION | SOURCE |
| --- | --- | --- |
| BN | boron nitride obtained under the trade description BORON NITRIDE COOLING FILLER PLATELETS, Grade Platelets 015/400 HR | 3M Company, Maplewood, Minnesota |
| HDPyCl | hexadecylpyridinium chloride, surfactant, powder | Alfa Aesar, Haverhill, Massachusetts |
| 2-EHMA | 2-ethylhexyl methacrylate, liquid | Alfa Aesar |
| HDMA | 1,6-hexanediol dimethacrylate, liquid | Alfa Aesar |
| EGDMA | ethylene glycol dimethacrylate | Alfa Aesar |
| BtPh | 2-[3-(2H-benzotriazol-2-yl)-4-hydroxy-phenyl]ethyl methacrylate | TCI America, Portland, Oregon |
| NaOEt | sodium ethoxide in ethanol (20% w/v) | Alfa Aesar |
| nanoSi | silica dispersant, made by the method described in U.S. Pat. No. 9,349,498 (Lottes et al.) in Example 10 | NA |
| KPS | potassium persulfate, powder | Amresco, Solon, Ohio |

Test Methods
Electrostatic Mobility Test

A table-top electrostatic coater (constructed as described below) was used to test the electrostatic mobility of the BN particles with and without the charge-modified particles. The coater consisted of a needle electrode that was 1.25 inches (3.12 centimeters (cm)) above a grounded copper plate. The needle electrode was connected to a Glassman DC power supply. A carded 19 grams per square meter (gsm) web comprised of 3 denier Huvis BiCo fibers (Huvis, Seoul, South Korea) was suspended 0.75 inches (1.91 cm) above the ground plane. The webs were coated with SCOTCH SPRAY 77 (available from 3M Company) multi-purpose spray adhesive.

For each sample, a spatula tip (approximately 0.10 grams (g)) of particles was placed on the ground electrode directly under the needle electrode. The power supply was energized to 10-12 kilovolts (kV) with a current of 0.1 milliamps (mA). Particle mobility was determined by whether the particle did (Yes), or did not (No), jump from the ground plane to the web. Observations are reported in Table 3.
Thermogravimetric Analysis (TGA)

The sample was heated to 100-120° C. and held for 20 minutes at that temperature under nitrogen gas to remove absorbed water and residual solvents. The sample was then cooled to 40° C. and subsequently heated to 550° C. at a rate of 10° C./minute under nitrogen gas. The weight loss was recorded at 500° C. Weight loss occurring below 500° C. was interpreted as the gravimetric amount of polymer deposited on the particles during the polymerization. Weight loss results are reported in Table 3.

Comparative Example A (CE-A): Modified BN Particle

Boron nitride (BN) particles were added to deionized (DI) water at about 5% weight to a 2 millimolar (mM) solution of HDPyCl. The particles were sonicated for 30 minutes and then stirred overnight. The solution was made basic by a small addition of 0.1 Normal (N) NaOH solution in water. To this solution, 2-EHMA was added in a 9:1 ratio with respect to the surfactant, and HDMA was added in a 1:1 ratio with respect to the surfactant (see Table 2). The polymerization was initiated with KPS, in a ratio of 1:10 relative to the monomer (see Table 2). The solution was allowed to react overnight. The solution was then filtered with an excess of DI water and a 50:50 mixture of water/ethanol. The particles were then vacuum dried.

Comparative Example B (CE-B): BN Particles with Flow Additive

BN particles were vigorously mixed with 1 wt. % nanoSi for 1 hour at 4000 revolutions per minute (RPM) using an Eirich EL1 mixer (Maschinenfabrik Gustav GmbH & Co. KG, Hardheim, Germany).

Comparative Example C (CE-C): BN Particles

BN particles were used as received.

Example 1 (EX-1): Charge Modified BN Particle

A stock solution of HDPyCl was made with a target concentration of 2 mM. To this solution, BN particles were added at 5% by weight and stirred overnight. The monomers 2-EHMA and BtPh were each added to the solution in a 5:1 ratio to the surfactant and EDGMA was added in a 2:1 ratio to the surfactant. To prepare a 1-liter (L) solution at 2 mM HDPyCl, 50 g of BN, 0.991 g of 2-EHMA, 1.625 g of BtPh, and 0.43 gm of EDGMA was used (see Table 2).

The polymerization was initiated with KPS in a ratio of 1:10 relative to the monomer. For a 1 L solution, 0.271 g of initiator was used. The solution was heated to 80° C. and held at this temperature overnight under constant stirring. The resulting solution was filtered through a medium frit filter, washed with water and 50:50 mixture of water/ethanol. The particles were then vacuum dried. The isolated particle were then reacted with an excess of NaOEt, vacuum filtered, and vacuum dried. The isolated particles were a bright orange color after reaction with NaOEt.

Example 2 (EX-2): Charge Modified BN Particles with Flow Additive

BN particles as described in CE-B. A 1.0 mM solution of HDPyCl in DI water was prepared and the BN particles were added and allowed to stir for between 1 and 4 hours. To this mixture, 2-EHMA, BtPh, and HDMA were added in 5:1, 5:1, and 1:1 ratio relative to the surfactant and stirred for an additional hour. KPS was then added in 1:10 ratio relative to the monomers and heated to 80° C. and held at this temperature overnight under constant stirring. The particles were filtered through a type-E frit, washed with water and a 50:50 mixture of water/ethanol, and vacuum dried. The particles were then added to a NaOEt solution in ethanol (20% w/v) (0.5 g particles to 3 mL NaOEt solution), stirred for 1-4 hours, filtered through a type-E frit, rinsed with NaOEt solution, and vacuum dried.

Example 3 (EX-3): Charge-Modified BN Particles with Flow Additive

The same procedure as EX-2 was followed, except that the concentration of HDPyCl was 8 mM instead of 2 mM. All necessary amounts were adjusted.

TABLE 2

| EXAMPLE | SURFACTANT, mM | 2-EHMA, Monomer:Surfactant (molar ratio) | DIMETHACRYLATE, Monomer:Surfactant (molar ratio) | BtPh Monomer:Surfactant (molar ratio) |
|---|---|---|---|---|
| CE-A | HDPyCl, 2 mM | 9:1 | HDMA, 2:1 | NA |
| CE-B | NA | NA | NA | NA |
| EX-1 | HDPyCl, 2 mM | 5:1 | EGDMA, 2:1 | 5:1 |
| EX-2 | HDPyCl, 1 mM | 5:1 | HDMA, 1:1 | 5:1 |
| EX-3 | HDPyCl, 8 mM | 5:1 | HDMA, 1:1 | 5:1 |

TABLE 3

| EXAMPLE | TGA WEIGHT LOSS, % | ELECTROSTATIC MOBILITY |
|---|---|---|
| CE-A | 3.0 | No |
| CE-B | 1.1 | No |
| CE-C | 0.5 | No |
| EX-1 | 3.1 | Yes |
| EX-2 | 2.7 | Yes (some clumping) |
| EX-3 | 19.1 | Yes (well dispersed) |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A charge-modified particle comprising an inorganic core and a shell surrounding the inorganic core, wherein the shell comprises a copolymer comprising monomeric units corresponding to free-radically polymerizable monomers, and wherein at least one of the monomeric units comprises a substituted benzotriazolylphenolate salt.

2. The charge-modified particle of claim 1, wherein the shell is covalently crosslinked.

3. The charge-modified particle of claim 1, wherein the shell further comprises a surfactant.

4. The charge-modified particle of claim 1, wherein at least a portion of the free-radically polymerizable monomers are hydrophobic.

5. The charge-modified particle of claim 1, wherein the copolymer is acrylic.

6. The charge-modified particle of claim 1, wherein the copolymer is a copolymer of styrene and at least one hydrophobic (meth)acrylic monomer.

7. The charge-modified particle of claim 1, wherein the substituted benzotriazolylphenolate salt is represented by the formula

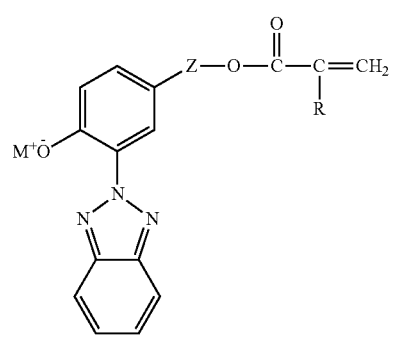

wherein
Z is an alkylene group having from 1 to 8 carbon atoms;
R is H or methyl; and
$M^+$ is an alkali metal cation or a quaternary ammonium ion having from 4 to 50 carbon atoms.

8. The charge-modified particle of claim 1, wherein the inorganic core comprises boron nitride.

9. A plurality of charge-modified particles according to claim 1.

10. The plurality of charge-modified particles according to claim 9, further comprising a flow additive comprising at least one of fumed or precipitated silica, fumed or precipitated alumina, silica nanoparticles, or alumina nanoparticles.

11. A composition comprising the plurality of charge-modified particles of claim 9 retained in an organic binder material.

12. A method comprising electrostatically coating the composition of claim 11 onto a substrate.

13. The method of claim 12 wherein the substrate comprises a curable make layer precursor disposed on a backing.

14. The method of claim 12, wherein the charge-modified particles comprise boron nitride.

15. A method of making charge-modified particles, the method comprising:
providing an aqueous mixture of inorganic particles and a surfactant;
adding at least one hydrophobic free-radically polymerizable monomer and a free-radically polymerizable substituted benzotriazole phenol to the aqueous mixture to form a free-radically polymerizable mixture, wherein at least a portion of the at least one hydrophobic free-radically polymerizable monomer is disposed in a surfactant bilayer that is disposed on the particles;
adding a free-radical initiator to the free-radically polymerizable mixture thereby polymerizing at least a portion of the hydrophobic free-radically polymerizable monomer to form the charge-modified particles, each comprising the inorganic core and a shell surrounding the inorganic core, wherein the shell comprises a copolymer comprising monomeric units corresponding to the at least one hydrophobic free-radically polymerizable monomer and the free-radically polymerizable substituted benzotriazole phenol; and
converting at least a portion of the monomeric units corresponding to the free-radically polymerizable substituted benzotriazole phenol into a substituted benzotriazolylphenolate salt.

16. The method of claim 15, wherein the shell comprises an organic polymer.

17. The method of claim 16, wherein the organic polymer comprises an acrylic polymer.

18. The method of claim 15, wherein the at least one hydrophobic free-radically polymerizable monomer comprises a monomer having at least two free-radically polymerizable groups.

19. The method of any claim 18, wherein the monomer having at least two free-radically polymerizable groups comprises at least one of divinylbenzene, 1,6-hexanediol di(meth)acrylate, 2,4-dimethyl-1,5-pentanediol di(meth)acrylate, 2-ethyl-4-methyl-1,5-pentanediol di(meth)acrylate, 2,4-di ethyl-1,5-pentanediol di(meth)acrylate, 2-ethyl-4-propyl-1,5-pentanediol di(meth)acrylate, 2,4-dipropyl-1,5-pentanedioldi(meth)acrylate, 2-isopropyl-4-methyl-1,5-pentanediol di(meth)acrylate, 2-ethyl-4-isopropyl-1,5-pentanediol di(meth)acrylate, 2,4-diisopropyl-1,5-pentanediol di(meth)acrylate, 2-isopropyl-4-propyl-1,5-pentanediol di(meth)acrylate, 1,1,1-trimethylolpropane tri(meth)acrylate, pentaerythritol tetra(meth)acrylate, bis[2-(methacryloyloxy)ethyl] phosphate, or dipentaerythritol penta(meth)acrylate.

20. The method of claim 15, further comprising isolating the charge-modified particles.

21. The method of claim 15, wherein the shell further comprises the surfactant.

22. The method of claim 15, wherein the at least one hydrophobic free-radically polymerizable monomer comprises at least one of styrene, N-(n-octadecyl) (meth)acrylamide, t-amyl (meth)acrylate, t-butyl (meth)acrylate, cyclohexyl (meth)acrylate, isodecyl (meth)acrylate, n-decyl (meth)acrylate, n-dodecyl (meth)acrylate, N-(n-dodecyl) (meth)acrylamide, n-hexyl (meth)acrylate, n-octyl (meth)acrylate, N-(tert-octyl)(meth)-acrylamide, 2-phenoxyethyl (meth)acrylate, phenyl (meth)acrylate, 2-phenylethyl (meth)acrylate, stearyl (meth)acrylate, undecyl (meth)acrylate, isobornyl (meth)acrylate, tridecyl (meth)(meth)acrylate, 1,4-butanediol di(meth)acrylate, 2-ethylhexyl (meth)acrylate, or neopentyl glycol di(meth)acrylate.

23. The method of claim 15, wherein the substituted benzotriazolylphenolate salt is represented by the formula

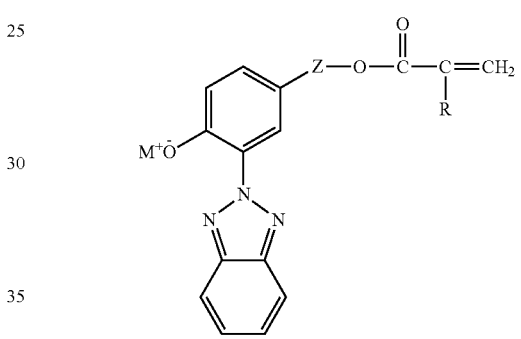

wherein
Z is an alkylene group having from 1 to 8 carbon atoms;
R is H or methyl; and
M⁺ is an alkali metal cation or a quaternary ammonium ion having from 4 to 50 carbon atoms.

24. The method of claim 15, wherein the inorganic particles comprise boron nitride.

25. The method of claim 15, further comprising adding a flow additive to the inorganic particles before adding the at least one hydrophobic free-radically polymerizable monomer and free-radically polymerizable substituted benzotriazole phenol to the aqueous mixture, wherein the flow additive comprises at least one of fumed or precipitated silica, fumed or precipitated alumina, silica nanoparticles, or alumina nanoparticles.

* * * * *